(12) United States Patent
Nogawa (10) Patent No.: US 9,781,765 B2
(45) Date of Patent: Oct. 3, 2017

(54) COMMUNICATION APPARATUS

(71) Applicant: Brother Kogyo Kabushiki Kaisha, Nagoya-shi, Aichi-ken (JP)

(72) Inventor: Hideki Nogawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/757,548

(22) Filed: Dec. 24, 2015

(65) Prior Publication Data

US 2016/0192429 A1    Jun. 30, 2016

(30) Foreign Application Priority Data

Dec. 25, 2014  (JP) ................. 2014-261612

(51) Int. Cl.
*H04W 76/02* (2009.01)
*H04L 29/08* (2006.01)
(Continued)

(52) U.S. Cl.
CPC ......... *H04W 76/028* (2013.01); *H04L 67/303* (2013.01); *H04W 8/005* (2013.01);
(Continued)

(58) Field of Classification Search
CPC .. H04L 67/303; H04W 48/20; H04W 76/028; H04W 84/18; H04W 84/20; H04W 8/005
See application file for complete search history.

(56) References Cited

U.S. PATENT DOCUMENTS 6,026,303 A    2/2000  Minamisawa
7,477,632 B1 *  1/2009  Radhakrishnan ..... H04L 63/104
                                              370/338
(Continued)

FOREIGN PATENT DOCUMENTS

JP    H10-145276 A    5/1998
JP    2006-279337 A    10/2006
JP    2013-106148 A    5/2013

OTHER PUBLICATIONS

Wi-Fi Alliance Technical Committee P2P Task Group, "Wi-Fi Peer-to Peer (P2P) Technical Specification", Version 1.1, pp. 1-159, 2010.

*Primary Examiner* — Mounir Moutaouakil
(74) *Attorney, Agent, or Firm* — Banner & Witcoff, Ltd.

(57) ABSTRACT

A first communication apparatus may comprise a memory configured to store a wireless profile being used in a first wireless network in a case where the first communication apparatus operates as a child station of the first wireless network. The first communication apparatus may determine, after the first wireless network in which each of the first communication apparatus and a second communication apparatus operates as a child station and a third communication apparatus operates as a parent station has been formed, whether a wireless connection between the first and third communication apparatuses is disconnected, and form a second wireless network in which the wireless profile is used in a case where it is determined that the wireless connection is disconnected, the second wireless network being a network in which the first communication apparatus operates as a parent station and the second communication apparatus operates as a child station.

11 Claims, 9 Drawing Sheets

(51) Int. Cl.
*H04W 8/00* (2009.01)
*H04W 84/18* (2009.01)
*H04W 48/20* (2009.01)
*H04W 84/20* (2009.01)

(52) U.S. Cl.
CPC ............ *H04W 48/20* (2013.01); *H04W 84/18* (2013.01); *H04W 84/20* (2013.01)

(56) References Cited

U.S. PATENT DOCUMENTS

| | | | | |
|---|---|---|---|---|
| 8,102,799 | B2* | 1/2012 | Alexander | H04L 12/2816 |
| | | | | 370/255 |
| 8,792,858 | B2* | 7/2014 | Cantini | H04L 63/0853 |
| | | | | 455/410 |
| 9,191,699 | B2* | 11/2015 | Agerbak | H04N 21/43615 |
| 9,247,492 | B2* | 1/2016 | Millington | H04W 76/02 |
| 9,456,258 | B2* | 9/2016 | Mani | G01D 4/02 |
| 9,603,114 | B2* | 3/2017 | Tanaka | H04W 60/00 |
| 2010/0020777 | A1* | 1/2010 | Nakajima | H04W 8/245 |
| | | | | 370/338 |
| 2015/0373029 | A1* | 12/2015 | Evenden | G06F 21/44 |
| | | | | 726/15 |
| 2016/0021525 | A1* | 1/2016 | Mani | H04W 8/005 |
| | | | | 455/434 |
| 2016/0021613 | A1* | 1/2016 | Mani | H04W 52/0209 |
| | | | | 370/311 |
| 2016/0080338 | A1* | 3/2016 | Wary | G06F 21/44 |
| | | | | 713/171 |

* cited by examiner

FIG. 6
(Case A)

FIG. 7
(Case B)

COMMUNICATION APPARATUS

CROSS-REFERENCE TO RELATED APPLICATION

This application claims priority to Japanese Patent Application No. 2014-261612, filed on Dec. 25, 2014, the contents of which are hereby incorporated by reference into the present application.

TECHNICAL FIELD

The present specification discloses a communication apparatus capable of operating as either a parent station or a child station of a wireless network.

DESCRIPTION OF RELATED ART

In an ad hoc network system, it is known that one wireless terminal, from a plurality of wireless terminals which may become either a parent apparatus or a child apparatus, is determined as a provisional parent apparatus, and the other wireless terminals are determined as child apparatuses. The provisional parent apparatus collects transfer rate and battery remaining amount from the child apparatuses, and selects a real parent apparatus based on this information.

SUMMARY

The present specification provides a technique wherein, a first communication apparatus may appropriately perform a wireless communication with a second communication apparatus in a case where a wireless connection between the first communication apparatus and a third communication apparatus is disconnected, after a first wireless network has been formed in which each of the first and second communication apparatus operates as a child station and the third communication apparatus operates as a parent station.

A first communication apparatus may comprise a processor; and a memory configured to store a wireless profile being used in a first wireless network in a case where the first communication apparatus operates as a child station of the first wireless network. The memory may be configured to further store computer-readable instructions therein, the computer-readable instructions, when executed by the processor, causing the first communication apparatus to perform: determining, after the first wireless network in which each of the first communication apparatus and a second communication apparatus operates as a child station and a third communication apparatus operates as a parent station has been formed, whether a wireless connection between the first communication apparatus and the third communication apparatus is disconnected under a situation where a power of the first communication apparatus is on; and forming a second wireless network in which the wireless profile in the memory is used in a case where it is determined that the wireless connection between the first communication apparatus and the third communication apparatus is disconnected, the second wireless network being a network in which the first communication apparatus operates as a parent station and the second communication apparatus operates as a child station.

A control method and computer-readable instructions for implementation of the first communication apparatus described above, and a non-transitory computer-readable recording medium in which the computer-readable instructions are stored, are also novel and useful. A communication system comprising the first communication apparatus and other communication apparatus (e.g. the second communication apparatus and/or the third communication apparatus) is also novel and useful.

BRIEF DESCRIPTION OF THE DRAWINGS

FIG. 2 shows a flowchart of a process in power ON.

Figure 1:
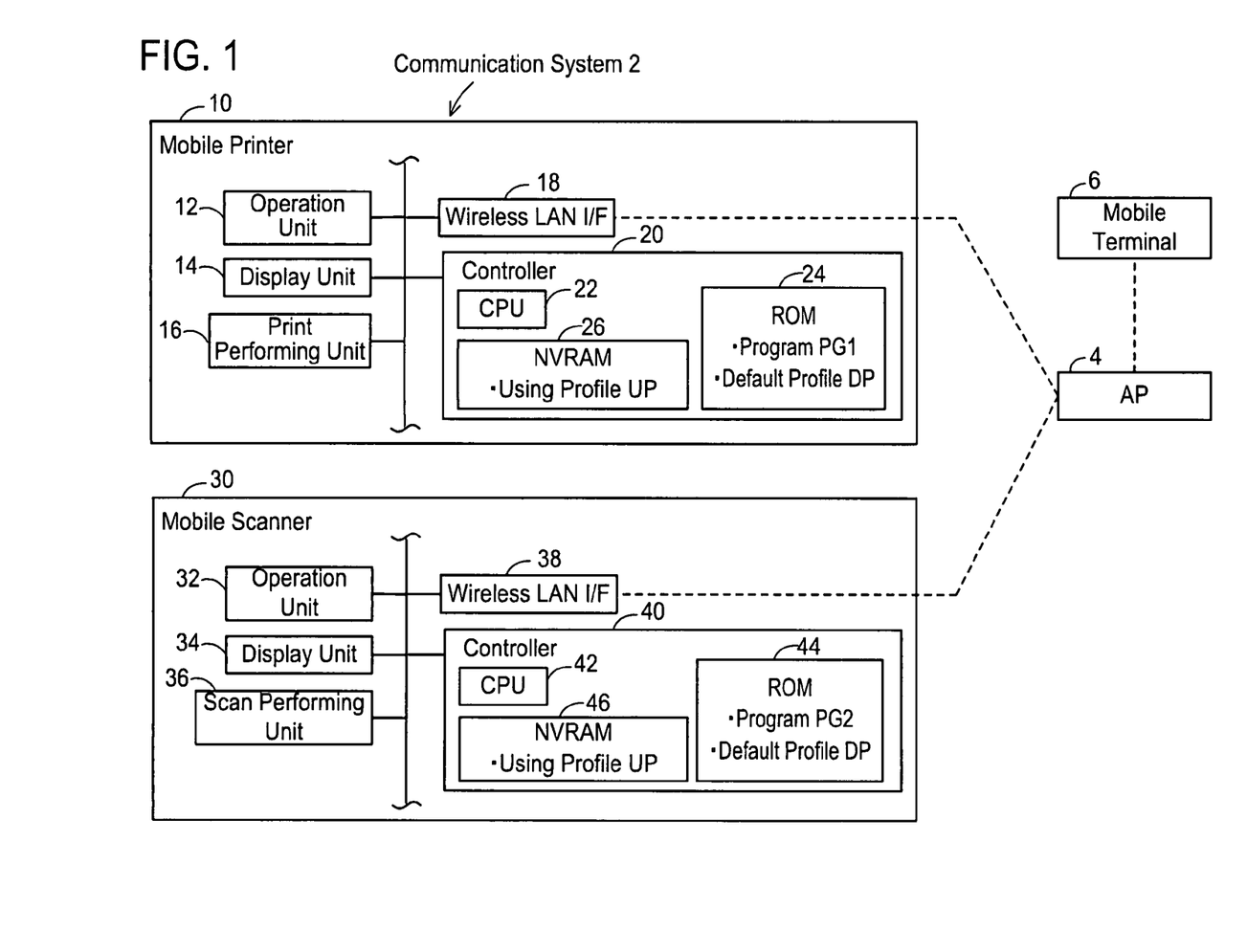
FIG. 1 shows a configuration of a communication system.

EMBODIMENT (Configuration of Communication System 2; FIG. 1)

As shown in FIG. 1, a communication system 2 comprises an access point 4, a mobile terminal 6, a mobile printer 10, and a mobile scanner 30. Below, the access point 4 is called "AP 4". Further, "mobile" is omitted for the mobile terminal 6, the mobile printer 10, and the mobile scanner 30, which are hence called "terminal 6", "printer 10", and "scanner 30", respectively.

A broken line in the figure shows how a wireless connection is established. Thereby, in the state of FIG. 1, the apparatuses 6, 10, 30 have established a wireless connection with the AP 4 which is operating as a parent station of a wireless network. That is, the apparatuses 6, 10, 30 are operating as child stations of the wireless network in which the AP 4 is operating as a parent station. Thus, the apparatuses 6, 10, 30 are capable of performing a wireless communication with one another via the AP 4 by using the wireless network. The terminal 6 is a portable terminal such as a smartphone, PDA (abbreviation of Personal Digital Assistants), notebook PC (abbreviation of Personal Computer), tablet PC, etc.

(Configuration of Printer 10)

The printer 10 is a portable peripheral apparatus (i.e., a peripheral apparatus of the terminal 6, or the like) capable of performing a print function. The printer 10 comprises an operation unit 12, a display unit 14, a print performing unit 16, a wireless LAN (abbreviation of Local Area Network) interface 18, and a controller 20. The units 12 to 20 are connected to bus line(s) (not shown).

The operation unit 12 comprises a plurality of buttons including a power button. A user can give various instructions to the printer 10 by operating the operation unit 12. The power button is a button for switching a state of the printer 10 between a state in which power of the printer 10 is turned on (i.e., ON state), and a state in which the power of the printer 10 is turned off (i.e., OFF state). The display unit 14 is a display for showing various information. The print performing unit 16 comprises several printing mechanisms such as an ink jet method, laser method, or the like.

The wireless LAN interface 18 is a wireless interface for performing a Wi-Fi communication in accordance with a Wi-Fi scheme. The Wi-Fi scheme herein is a wireless communication scheme for performing a wireless communication in accordance with, e.g., IEEE (abbreviation of The Institute of Electrical and Electronics Engineers, Inc.) standard 802.11 or standards conforming thereto (e.g., 802.11a, 11b, 11g, 11n, etc.). The wireless LAN interface 18 particularly supports a WFD (abbreviation of Wi-Fi Direct (registered trademark)) scheme. The WFD scheme is a wireless communication scheme described in "Wi-Fi Peer-to-Peer (P2P) Technical Specification Version 1.1." created by the Wi-Fi Alliance.

The controller 20 comprises a CPU 22, a ROM (abbreviation of Read Only Memory) 24, and a NVRAM (abbreviation of Non-Volatile Random Access Memory) 26. The CPU 22 is a processor which performs various processes in accordance with a program PG1 stored in the ROM 24.

The ROM 24 stores not only the program PG1, but also a default profile DP determined in advance by a vendor of the printer 10. The default profile DP includes an SSID (abbreviation of Service Set Identifier), authentication scheme information, encryption scheme information, and password. The SSID is identifying information for identifying the wireless network. The authentication scheme information and encryption scheme information indicate an authentication scheme and encryption scheme for performing authentication and encryption in the wireless network. The password is a key for performing encryption.

The NVRAM 26 is a nonvolatile memory. Consequently, information in the NVRAM 26 is not erased even if the power of the printer 10 is turned off. In a case where the printer 10 operates as a child station of a wireless network, the NVRAM 26 stores a using profile UP, which is a wireless profile used in that wireless network. Like the default profile DP, the using profile UP includes an SSID, authentication scheme information, encryption scheme information, and password. The SSID and password in the using profile UP are each different from the SSID and password in the default profile DP. The authentication scheme information and encryption scheme information in the using profile UP may each be the same information as the authentication scheme information and encryption scheme information in the default profile DP, or may be different information.

(Configuration of Scanner 30)

The scanner 30 is a portable peripheral apparatus (i.e., a peripheral apparatus of the terminal 6, or the like) capable of performing a scan function. A vendor of the scanner 30 is the same as the vendor of the printer 10. The scanner 30 comprises an operation unit 32, a display unit 34, a scan performing unit 36, a wireless LAN interface 38, and a controller 40. The units 32 to 40 are connected to bus line(s) (not shown).

The units 32, 34, 38 of the scanner 30 are the same as the units 12, 14, 18 of the printer 10. The scan performing unit 36 comprises scanning mechanisms such as a CCD (abbreviation of Charge Coupled Device) scheme, CIS (abbreviation of Contact Image Sensor) scheme, etc. The controller 40 comprises a CPU 42, a ROM 44, and a NVRAM 46. The CPU 42 is a processor which performs various processes in accordance with a program PG2 stored in the ROM 44. A default profile DP in the ROM 44 of the scanner 30 is the same as the default profile DP in the ROM 24 of the printer 10. In a case where the scanner 30 operates as a child station of a wireless network, the NVRAM 46 stores a using profile UP used in that wireless network. In the state of FIG. 1, since the printer 10 and the scanner 30 each operate as a child station of the wireless network formed by the AP 4, the using profile UP in the NVRAM 46 of the scanner 30 is the same as the using profile UP in the NVRAM 26 of the printer 10.

Figure 2:
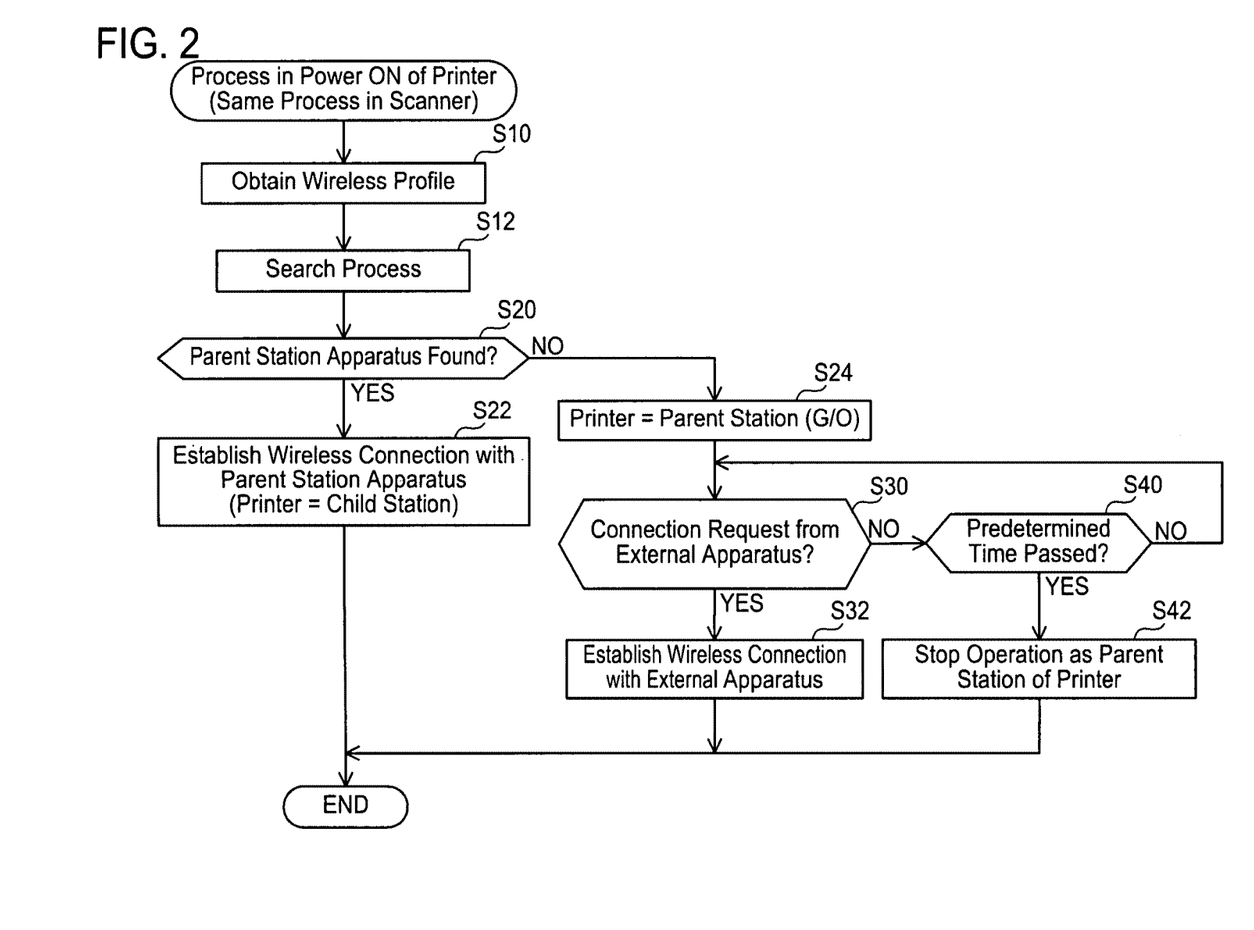

(Process in Power ON; FIG. 2)

Next, a process when power is ON performed by the CPU 22 of the printer 10 will be described with reference to FIG. 2. Moreover, although not described, like the CPU 22 of the printer 10, the CPU 42 of the scanner 30 can also perform the process of FIG. 2. This point also applies to the processes of FIG. 3 to FIG. 5, described below.

In a case where the power button in the operation unit 12 is operated by the user under a situation where the power of the printer 10 is an OFF state, the CPU 22 starts processes from S10 onward. In S10, the CPU 22 obtains a wireless profile. In a case where the printer 10 has a past history of operating as a child station of a wireless network, i.e., in a case where the using profile UP is stored in the NVRAM 26, the CPU 22 obtains the using profile UP from the NVRAM 26. Further, in a case where the printer 10 does not have the past history of operating as a child station of a wireless network, i.e., in a case where the using profile UP is not stored in the NVRAM 26, the CPU 22 obtains the default profile DP from the ROM 24. Below, the wireless profile obtained in S10 is called "target wireless profile".

In S12, the CPU 22 performs a search process for searching for a parent station apparatus (e.g., the AP 4) which operates as a parent station of the wireless network identified by the SSID in the target wireless profile. Specifically, the CPU 22 sends a Probe Request signal including the SSID in the target wireless profile via the wireless LAN interface 18.

In S20, the CPU 22 determines whether or not a parent station apparatus has been found. Specifically, in a case where a Probe Response signal is received from the parent station apparatus via the wireless LAN interface 18, the CPU 22 determines that a parent station apparatus has been found (YES in S20), and proceeds to S22. On the other hand, in a case where a Probe Response signal is not received even after a predetermined time has passed since the Probe Request signal was sent in S12, the CPU 22 determines that a parent station apparatus has not been found (NO in S20), and proceeds to S24.

In S22, the CPU 22 establishes a wireless connection between the printer 10 and the parent station apparatus via the wireless LAN interface 18. Specifically, by using the respective information (i.e., SSID, authentication scheme, encryption scheme information, password) in the target wireless profile, the CPU 22 performs a wireless communication for authentication and encryption (called "authentication communication" below) with the parent station apparatus. Thus, a wireless connection between the printer 10 and the parent station apparatus is established, and the printer 10 starts operation as a child station of a wireless network. When S22 ends, the process of FIG. 2 ends.

In S24, the CPU 22 shifts an operation state of the printer 10 from a device state of the WFD scheme to a Group Owner state (called "G/O state" below), starting operation as the parent station of the wireless network in which the target wireless profile is used. At this stage, only the printer 10 is belonged to the wireless network, and other apparatuses (i.e., child stations) are not belonged to the wireless network.

After finishing S24, the CPU 22 sequentially performs determination processes of S30 and S40. In S30, the CPU 22 determines whether a connection request has been received from an external apparatus (e.g., the terminal 6) via the wireless LAN interface 18. In the case of receiving a Probe Request signal (i.e., connection request) including the SSID in the target wireless profile, the CPU 22 determines YES in S30 and, in S32, establishes a wireless connection between the printer 10 and the external apparatus via the wireless LAN interface 18. Specifically, the CPU 22 performs an authentication communication with the external apparatus by using the respective information in the target wireless profile. Thus, a wireless connection between the printer 10 and the external apparatus is established, and the external apparatus starts operation as a child station of the wireless network in which the printer 10 operates as the parent station. When S32 ends, the process of FIG. 2 ends.

Further, in S40, the CPU 22 determines whether a predetermined time has passed since the printer 10 started the operation as a parent station without receiving a connection request from the external apparatus (NO in S30). In a case where the predetermined time has passed, the CPU 22 determines YES in S40 and, in S42, stops the operation of the printer 10 as a parent station. That is, the CPU 22 shifts the operation state of the printer 10 from G/O state to device state. Thus, the wireless network in which the printer 10 operates as a parent station disappears. Since the printer 10 needs to send a beacon signal in a situation where the printer 10 is the parent station, power consumption of the printer 10 is greater than in a situation in which the printer 10 is not a parent station. In the present embodiment, since the printer 10 stops the operation as a parent station in S42, power consumption of the printer 10 can be reduced. When S42 ends, the process of FIG. 2 ends.

Figure 3:
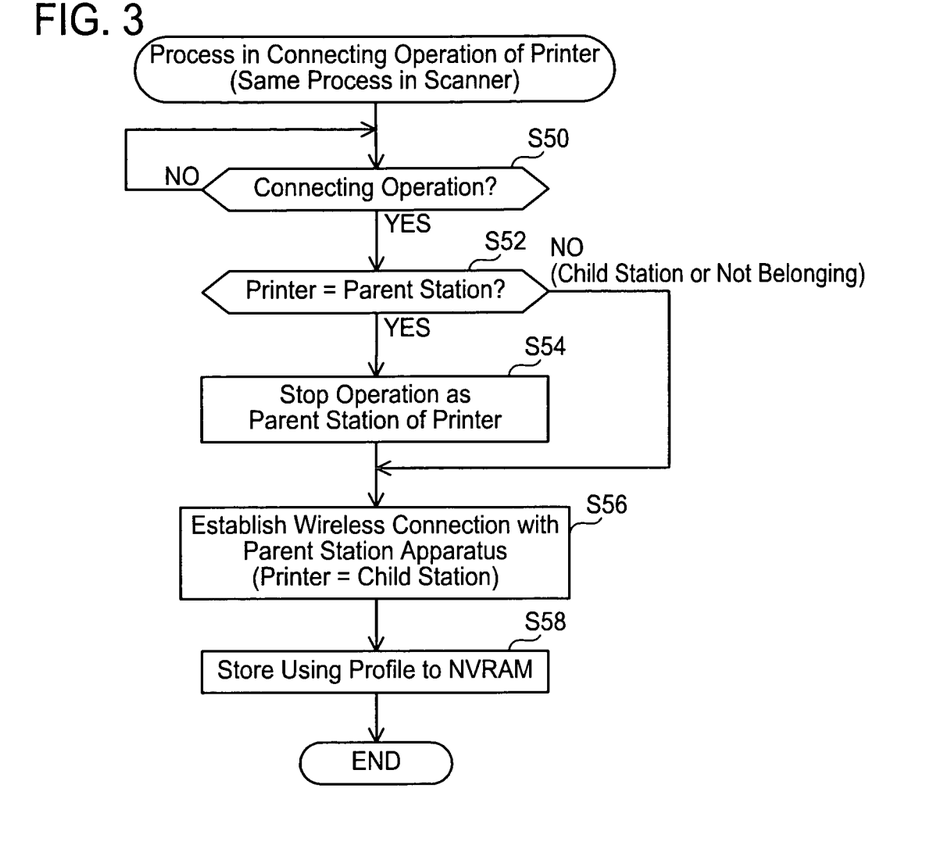
FIG. 3 shows a flowchart of a process in connecting operation.

(Process in Connecting Operation; FIG. 3)

Next, a connecting operation performed by the CPU 22 of the printer 10 will be described with reference to FIG. 3. In S50, the CPU 22 monitors whether the user has performed the connecting operation on the operation unit 12. The connecting operation is an operation for establishing a wireless connection between the printer 10 and a parent station apparatus (e.g., the AP 4) of a wireless network and, in the present embodiment, is a WPS (abbreviation of Wi-Fi Protected Setup) push button operation. Below, a parent station apparatus with which the printer 10 should establish a wireless connection, and a wireless network formed by the parent station apparatus, are called "target parent station apparatus" and "target wireless network", respectively. In a case where the connecting operation is performed, the CPU 22 determines YES in S50, and proceeds to S52.

In S52, the CPU 22 determines whether the printer 10 is operating as a parent station of a wireless network. In a case where the operation state of the printer 10 is G/O state, the CPU 22 determines YES in S52 and, in S54, stops the operation of the printer 10 as a parent station (i.e., shifts the operation state of the printer 10 from G/O state to device state). When S54 ends, the process proceeds to S56. On the other hand, in a case where the operation state of the printer 10 is not G/O state (i.e., in a case of operating as a child station, or in a case of not being belonged to a wireless network), the CPU 22 determines NO in S52, and proceeds to S56.

In S56, the CPU 22 establishes a wireless connection between the printer 10 and the target parent station apparatus via the wireless LAN interface 18. Specifically, the CPU 22 first receives a wireless profile (i.e., the using profile UP) used in the target wireless network from the target parent station apparatus via the wireless LAN interface 18. Then, using the respective information in the using profile UP, the CPU 22 performs an authentication communication with the target parent station apparatus. Thus, a wireless connection between the printer 10 and the target parent station apparatus is established, and the printer 10 starts operation as a child station of the target wireless network. Moreover, in a case where NO was determined in S52 in response to the printer 10 operating as a child station of a wireless network, S56 is performed, and the wireless connection between the printer 10 and the parent station apparatus of the wireless network is disconnected, and a wireless connection between the printer 10 and the target parent station apparatus is newly established.

In S58, the CPU 22 stores the using profile UP received in S56 in the NVRAM 26. In a case where an old using profile UP has already been stored in the NVRAM 26 before S58 is performed, the CPU 22 stores the new using profile UP received in S56 in the NVRAM 26 instead of the old using profile UP. When S58 ends, the process of FIG. 3 ends.

Figure 4:
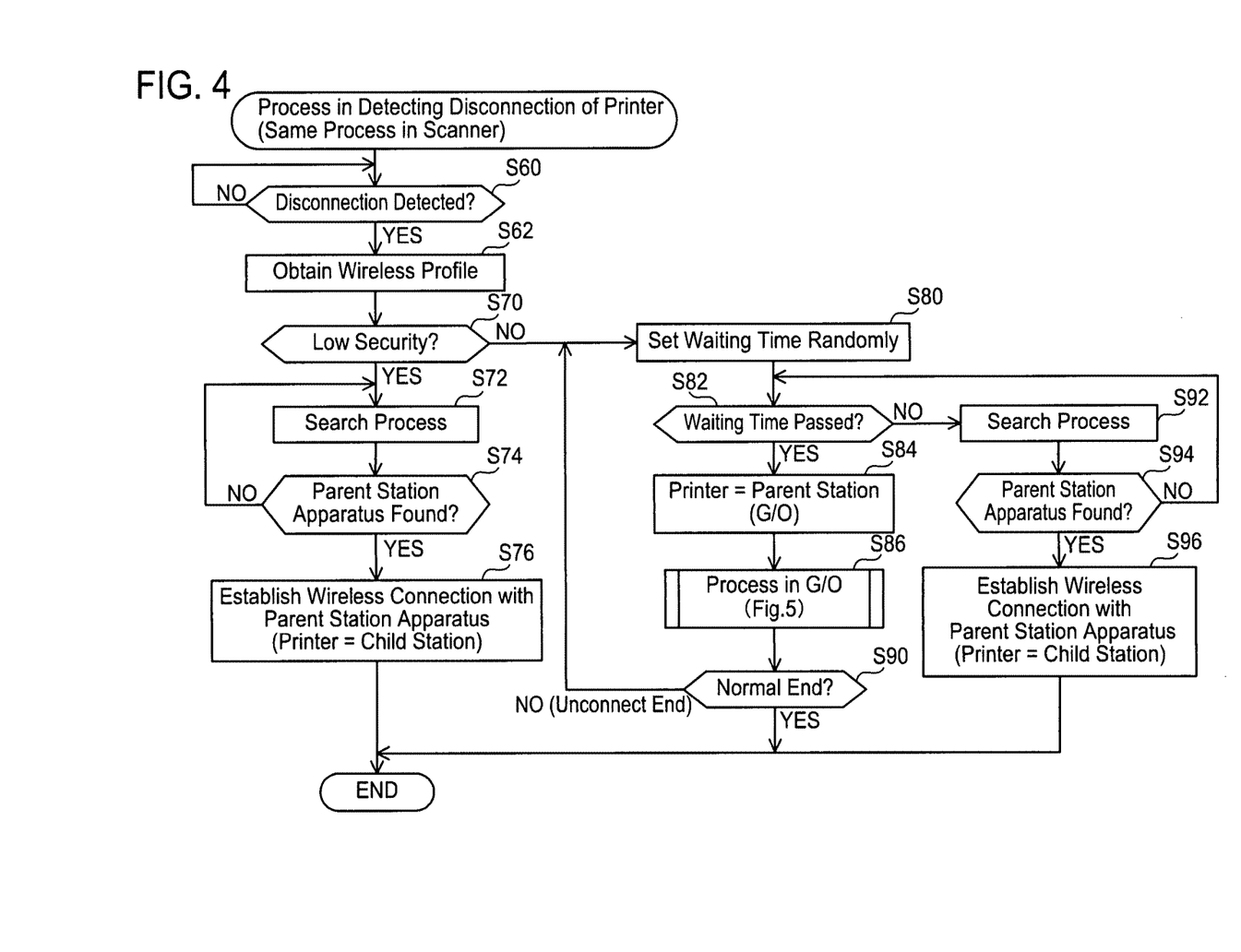
FIG. 4 shows a flowchart of a process in detecting disconnection.

(Process in Detecting Disconnection; FIG. 4)

Next, a process in detecting disconnection performed by the CPU 22 of the printer 10 will be described with reference to FIG. 4. In S60, the CPU 22 monitors whether the wireless connection between the printer 10 and the target parent station apparatus is disconnected while the printer 10 is operating as a child station of the target wireless network. Specifically, in a case where a beacon signal is not received from the target parent station apparatus for a predetermined time, the CPU 22 determines that the wireless connection is disconnected (YES in S60), and proceeds to S62.

In S62, the CPU 22 obtains a wireless profile (i.e., the using profile UP) from the NVRAM 26. Below, the wireless profile obtained in S62 is called "target wireless profile".

In S70, the CPU 22 determines whether a security level of the target wireless profile is low. Specifically, in a case where a combination of authentication scheme information and encryption scheme information in the target wireless profile includes a predetermined combination, the CPU 22 determines that the security level of the target wireless profile is relatively high (NO in S70), and proceeds to S80. In the present embodiment, the predetermined combination is a combination which includes authentication scheme information "WPA2PSK" and encryption scheme information "AES". However, in a modification, the predetermined combination may be another one combination, or may be two or more combinations which include the combination of "WPA2PSK" and "AES". On the other hand, in a case where the combination of authentication scheme information and encryption scheme information in the target wireless profile does not include the predetermined combination, the CPU 22 determines that the security level of the target wireless profile is relatively low (YES in S70), and proceeds to S72.

As with S12 and S20 of FIG. 2, in S72 and S74 the CPU 22 performs a search process and a determination process. The CPU 22 repeatedly performs the processes of S72 and S74 until a parent station apparatus is found (i.e., until YES is determined in S74). S76, which is performed in the case of YES in S74, is the same as S22 of FIG. 2. Thus, a wireless connection is re-established between the printer 10 and the target parent station apparatus, and the printer 10 again operates as a child station of the target wireless network. When S76 ends, the process of FIG. 4 ends.

As described above, in the case where the security level of the target wireless profile is relatively low (the case of YES in S70), the printer 10 does not form a wireless network in which the printer 10 operates as a parent station (i.e., does not perform S84, to be described later). Since it is possible for the printer 10 to prevent formation of a wireless network in which the security level is relatively low, it is possible to appropriately prevent illegal access to the printer 10 from an external apparatus. Moreover, in a modification, S70 to S76 may be omitted and, when S62 ends, the process may proceed to S80. That is, the printer 10 may perform the processes from S80 onward regardless of the security level of the target wireless profile.

In S80, by randomly selecting one value from among a plurality of values, the CPU 22 randomly sets a waiting time indicating the one value, and starts a countdown of the waiting time. Moreover, in a modification, the CPU 22 may, for example, set a waiting time indicating a value included in a MAC address of the printer 10. Since the MAC address of the printer 10 is a unique value determined at random, in the present modification, also, the waiting time is set randomly. Further, in another modification, the waiting time may be randomly determined in advance by the vendor of the printer 10, and stored in the ROM 24. In this case, the CPU 22 randomly sets the waiting time by reading the waiting time from the ROM 24. Further, in yet another modification, the waiting time may not be set randomly, but may be a fixed value that is determined in advance.

In S82, the CPU 22 monitors whether the waiting time has passed, i.e., the count of the waiting time has become zero. In a case where the waiting time has passed (YES in S82), in S84 the CPU 22 shifts the operation state of the printer 10 from the device state of the WFD scheme to the G/O state, and forms a wireless network in which the target wireless profile is used. Since this wireless network is formed instead of the target wireless network formed by the target parent station apparatus, the wireless network formed here will be called "alternate wireless network" below. An SSID of the alternate wireless network is the same as the SSID of the target wireless network to which the printer 10 is belonged as a child station. At this stage, only the printer 10 is belonged to the alternate wireless network.

Figure 5:
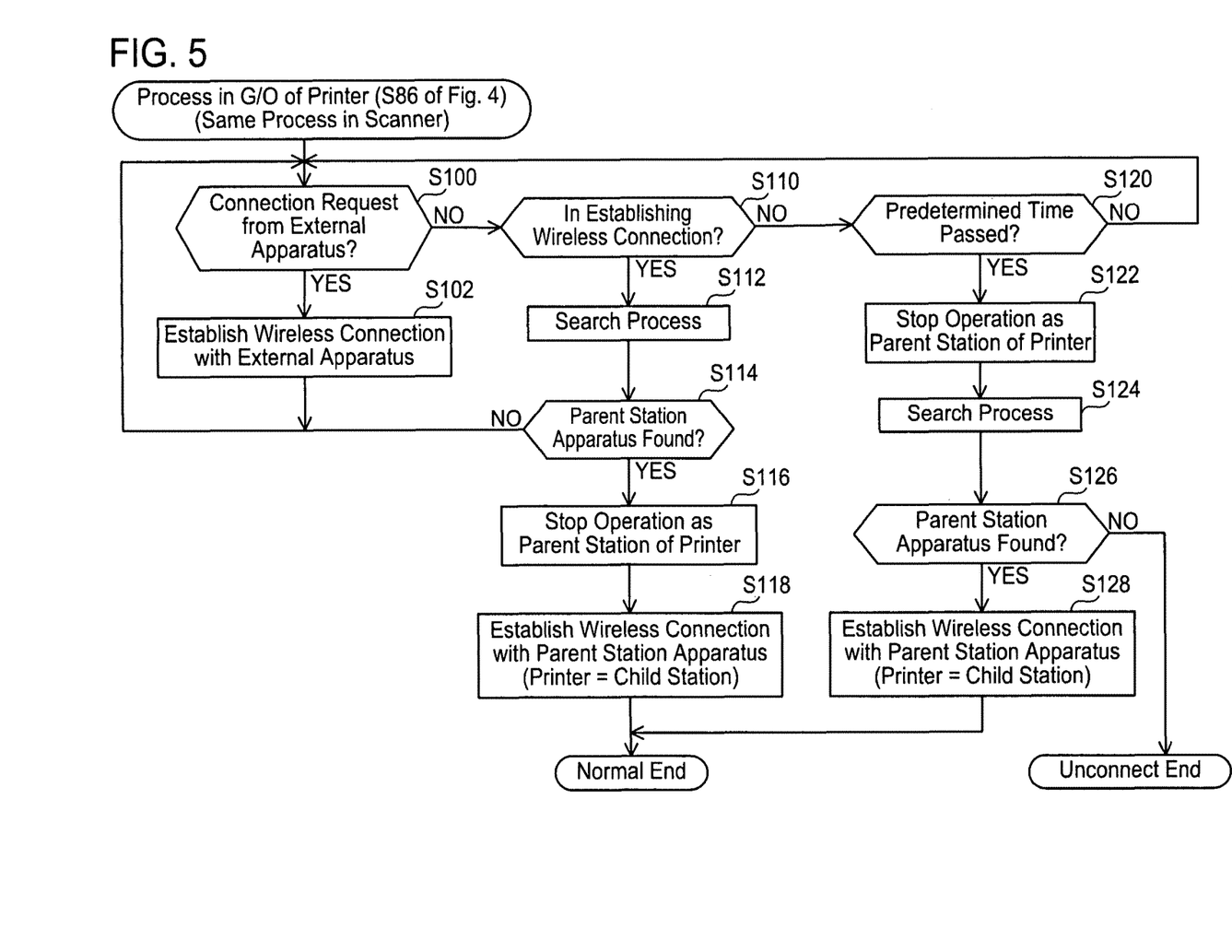
FIG. 5 shows a flowchart of a process in G/O.

In S86, the CPU 22 performs a process in G/O (see FIG. 5). In S90, the CPU 22 determines whether the process in G/O ended as normal END or as unconnect END. The normal END indicates that the process of FIG. 5 ended in response to the printer 10 establishing a wireless connection with the target parent station apparatus (see S118, S128), Further, the unconnect END indicates that the process of FIG. 5 ended in response to the printer 10 not establishing a wireless connection with any apparatus (see NO in S126). The CPU 22 ends the process of FIG. 4 in the case where the process in G/O ended as the normal END, and returns to S80 in the case where the process in G/O ended as the unconnect END. Thus, the CPU 22 newly sets the waiting time (S80), and again performs the processes from S82 onward.

On the other hand, in the case where the waiting time has not passed (NO in S82), in S92 and S94 the CPU 22 performs a search process and determination process, as with S12 and S20 of FIG. 2. In a case where the target parent station apparatus has not been found (NO in S94), the CPU 22 returns to S82. S96, which is performed in a case where the target parent station apparatus has been found (YES in S94), is the same as S22 of FIG. 2. Thus, a wireless connection between the printer 10 and the target parent station apparatus is re-established, and the printer 10 again operates as a child station of the target wireless network. When S96 ends, the process of FIG. 4 ends.

(Process in G/O; FIG. 5)

Next, the process in G/O performed in S86 of FIG. 4 will be described with reference to FIG. 5. The CPU 22 sequentially performs the determination processes of S100, S110, and S120.

Like S30 and S32 of FIG. 2, in S100 and S102 the CPU 22 determines reception of a connection request, and establishes a wireless connection with an external apparatus. When S102 is performed, a wireless connection between the printer 10 and the external apparatus is established, and the external apparatus starts operation as a child station of an alternate wireless network in which the printer 10 operates as a parent station. When S102 ends, the process returns to S100.

In S110, the CPU 22 determines whether a wireless connection has been established between the printer 10 and one or more external apparatuses, i.e., whether a child station of the alternate wireless network is present. In a case where it is determined that the wireless connection has been established (YES in S110), in S112 and S114 the CPU 22 performs a search process and determination process, like S12 and S20 of FIG. 2. In a case where a target parent station apparatus (NO in S114) has not been found, the CPU 22 returns to S100.

On the other hand, in a case where a target parent station apparatus has been found (YES in S114), in S116 the CPU 22 stops the operation as a parent station of the printer 10 (i.e., shifts the operation state of the printer 10 from G/O state to device state). Thus, the alternate wireless network formed in S84 of FIG. 4 disappears. S118 is the same as S22 of FIG. 2. Thus, a wireless connection between the printer 10 and the target parent station apparatus is re-established, and the printer 10 again operates as a child station of the target wireless network. When S118 ends, the process of FIG. 5 ends as normal END.

In S120, the CPU 22 determines whether the predetermined time has passed from starting the process of FIG. 5 without a wireless connection having been established between the printer 10 and any external apparatus (NO in S110). In a case where it is determined that the predetermined time has passed (YES in S120), in S122 the CPU 22 stops the operation as a parent station. Thus, the alternate wireless network formed in S84 of FIG. 4 disappears. Since the printer 10 stops the operation as a parent station in S122, the power consumption of the printer 10 can be reduced.

Next, in S124 and S126, the CPU 22 performs a search process and determination process, like S12 and S20 of FIG. 2. S128, which is performed in the case where the target parent station apparatus has been found (YES in S126), is the same as S22 of FIG. 2. Thus, a wireless connection between the printer 10 and the target parent station apparatus is re-established, and the printer 10 again operates as a child station of the target wireless network. When S128 ends, the process of FIG. 5 ends as normal END. On the other hand, in a case where the target parent station apparatus has not been found (NO in S126), the process of FIG. 5 ends as unconnect END.

Figure 6:
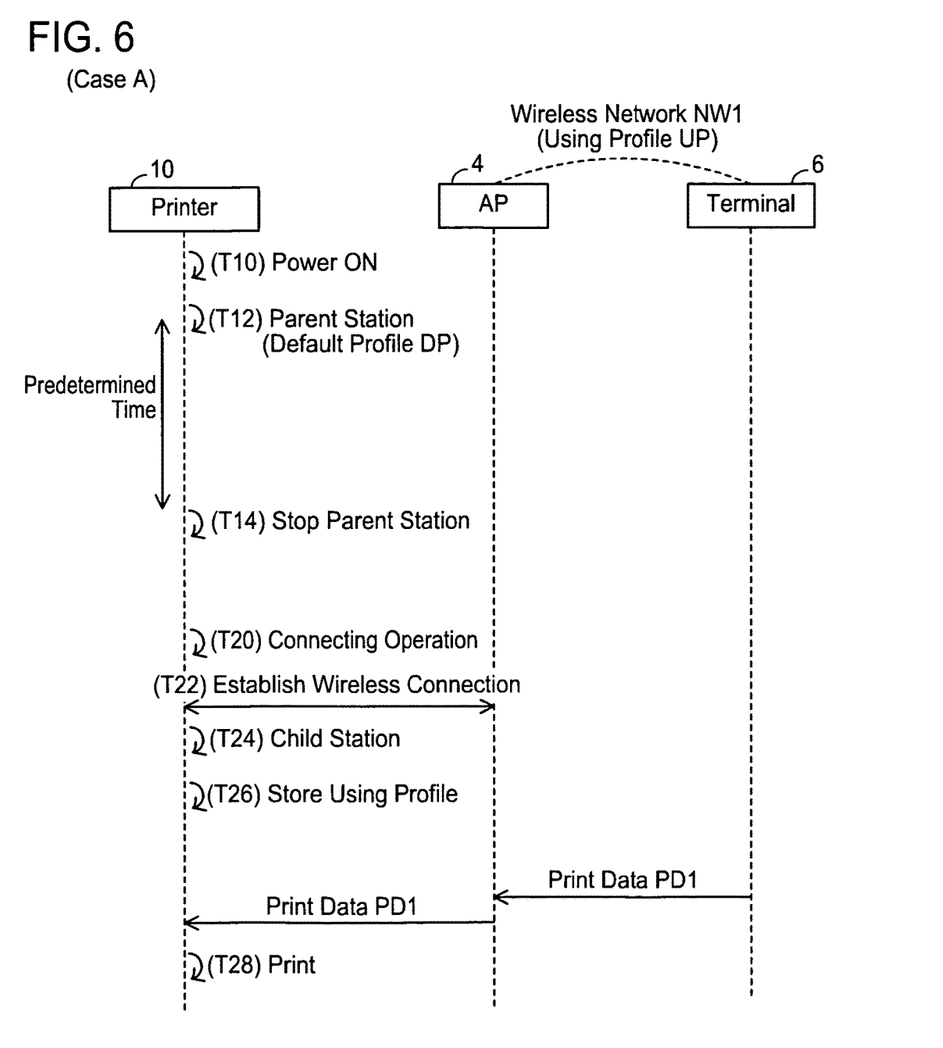
FIG. 6 shows a sequence view of a case A in which a printer establishes a wireless connection with an access point.

(Case A; FIG. 6)

Next, specific cases A to D realized by the flowcharts of FIG. 2 to FIG. 5 will be described with reference to FIG. 6 to FIG. 9. In any of cases A to D, the terminal 6, the printer 10, and the scanner 30 are assumed to be possessed by a same user. Further, the AP 4 is assumed to be a stationary AP placed, for example, in an office. A using profile UP which has relatively high security (i.e., "WPA2PSK" and "AES") is used in a wireless network NW1 in which the AP 4 operates as a parent station. In an initial state of case A of FIG. 6, the terminal 6 is operating as a child station of the wireless network NW1. Further, the printer 10 does not have a past history of operating as a child station of a wireless network.

In T10, the power of the printer 10 is switched from an OFF state to an ON state (a trigger of the process of FIG. 2). The printer 10 obtains the default profile DP from the ROM 24 (S10), and performs the search process and determination process (S12, S20). Then, the printer 10 determines that a parent station apparatus is not found (NO in S20) and, in T12, starts operation as a parent station in order to form a wireless network in which the default profile DP is used (S24). The printer 10 determines that a predetermined time has passed (YES in S40) without receiving a connection request from an external apparatus (NO in S30) and, in T14, stops the operation as a parent station (S42).

In T20, the connecting operation for establishing a wireless connection between the printer 10 and the AP 4 is performed by the user (YES in S50 of FIG. 3). In this case, in T22, the printer 10 establishes a wireless connection with the AP 4 (S56) and, in T24, operates as a child station of the wireless network NW1 (S56). Then, the printer 10 stores the using profile UP used in the wireless network NW1 in the NVRAM 26 (S58).

As described above, in case A, the wireless network NW1 is formed in which the printer 10 and the terminal 6 operate as child stations, and the AP 4 operates as a parent station. In this case, the printer 10 can perform a wireless communication with the terminal 6 via the AP 4 by using the wireless network NW1. For example, the printer 10 receives print data PD1 from the terminal 6 via the AP 4. In this case, in T28, the printer 10 performs a print of an image represented by the print data PD1.

Figure 7:
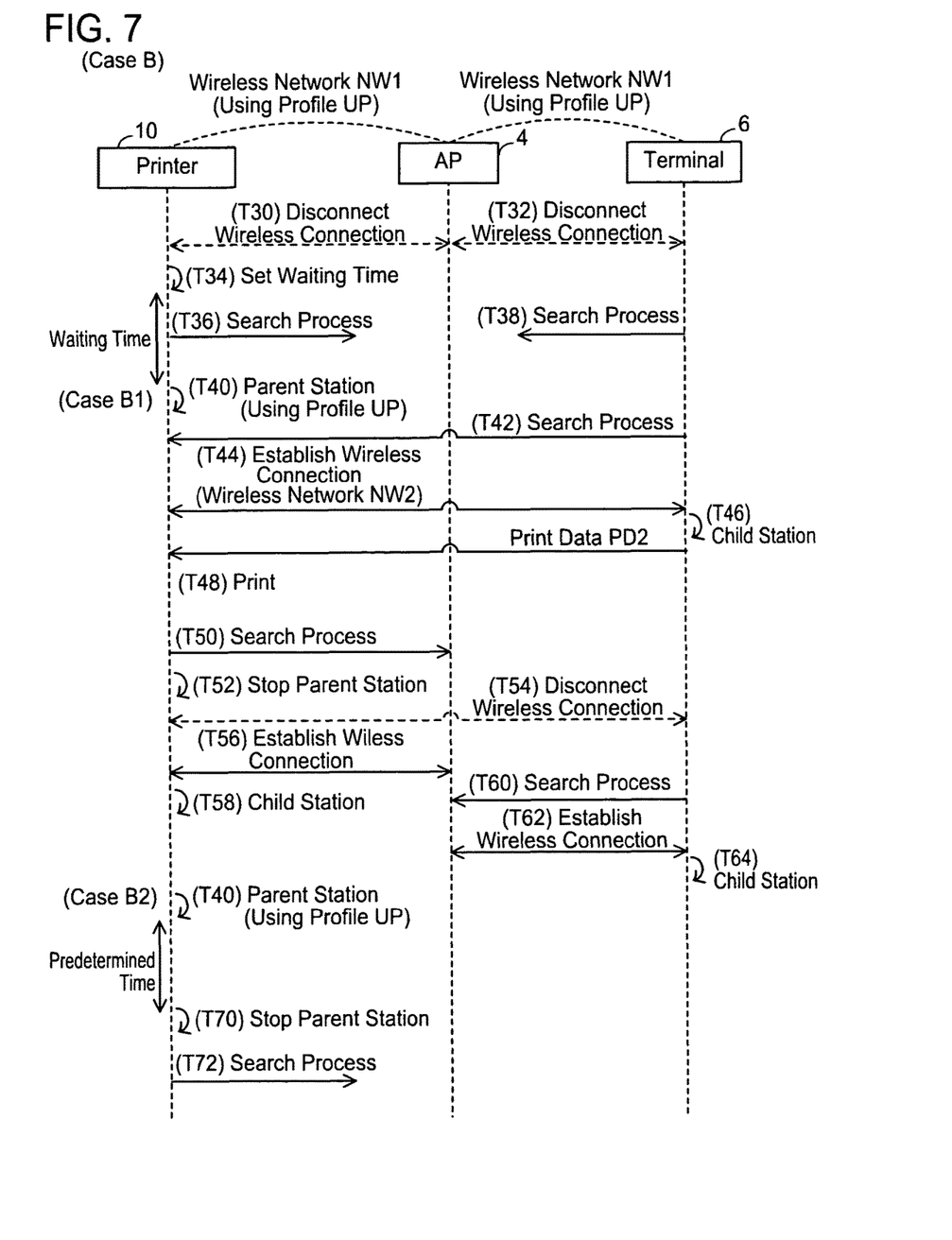
FIG. 7 shows a sequence view of a case B in which a wireless connection between apparatuses and the access point is disconnected.

(Case B; FIG. 7)

Case B is a continuation of case A, wherein the wireless network NW1 to which the apparatuses 4, 6, 10 are belonged has been formed. For example, the user is assumed to possess the printer 10 and the terminal 6, and is assumed to go out of the office in which the AP 4 is located. In this case, in T30, the wireless connection between the printer 10 and the AP 4 is disconnected (YES in S60 of FIG. 4) and, in T32, the wireless connection between the terminal 6 and the AP 4 is disconnected.

In T34, the printer 10 sets the waiting time randomly (S80). In T36, the printer 10 performs a search process (S92), but cannot find the AP 4 (NO in S94). Further, in T38, the terminal 6 performs the search process, but cannot find the AP 4. Then, case B1 or case B2 below is realized.

(Case B1)

In T40 of case B1, the printer 10 determines that the waiting time has passed (YES in S82), and starts operation as a parent station in order to form a wireless network NW2 in which the using profile UP is used (S84). Then, in T42, the terminal 6 performs a search process, and can find the printer 10 which is operating as a parent station. That is, the printer 10 receives a Probe Request signal (i.e., connection request) including the SSID in the using profile UP from the terminal 6 (YES in S100 of FIG. 5), and sends a Probe Response signal to the terminal 6. Then, in T44, the printer 10 establishes a wireless connection with the terminal 6, and causes the terminal 6 to be belonged as a child station to the wireless network NW2 (S102). Thus, in T46, the terminal 6 starts operation as a child station of the wireless network NW2. As a result, the wireless network NW2 is formed in which the printer 10 operates as a parent station, and the terminal 6 operates as a child station.

As described above, in an initial state of case B, each of the printer 10 and the terminal 6 operates as a child station of the wireless network NW1 by using a same wireless profile, i.e., the using profile UP. Then, in a case where the wireless connection with the AP 4 is disconnected (T30), the printer 10 starts operation as a parent station of the wireless network NW2 (T40), continuing to use the using profile UP used in the wireless network NW1. Consequently, by using the using profile UP as it is, the terminal 6 can also establish a wireless connection with the printer 10, and start operation as a child station of the wireless network NW2 (T46). Moreover, the wireless network NW2 to which both the printer 10 and the terminal 6 are belonged is formed without the user performing an operation for connecting an AP different from the AP 4 in either of the printer 10 and the terminal 6. As a result, the printer 10 can appropriately perform a wireless communication with the terminal 6 not via the AP 4, by using the wireless network NW2. For example, the printer 10 receives print data PD2 from the terminal 6 not via the AP 4. In this case, in T48, the printer performs a print of an image represented by the print data PD2. Thus, the user, while out of the office, can cause the printer 10 to perform a print by using the terminal 6.

Moreover, in the present case, a situation is assumed in which the wireless connection between the AP 4 and the apparatuses 6, 10 is disconnected due to the user possessing the printer 10 and the terminal 6, and leaving away from the AP 4. However, for example, the wireless connection between the AP 4 and the apparatuses 6, 10 may be disconnected due to the power of the AP 4 being switched from the ON state to the OFF state, or due to a failure occurring in the AP 4. Even when such an event occurs, the printer 10 can appropriately perform a wireless communication with the terminal 6 not via the AP 4, by using the wireless network NW2.

Below, a situation is assumed in which the user returns to the office from being out. In T50, the printer 10 performs a search process (S112), and can find the AP 4 (YES in S114). In this case, in T52, the printer 10 stops the operation as a parent station (S116). As a result, in T54, the wireless connection between the printer 10 and the terminal 6 is disconnected, and the wireless network NW2 disappears. Then, in T56, the printer 10 re-establishes a wireless connection with the AP 4 (S118) and, in T58, again operates as a child station of the wireless network NW1 (S118). On the other hand, in T60, the terminal 6 performs a search process, and can find the AP 4. In this case, in T62, the terminal 6 re-establishes a wireless connection with the AP 4 and, in T64, again operates as a child station of the wireless network NW1.

As described above, the wireless network NW1 is re-formed in which each of the printer 10 and the terminal 6 operates as a child station and the AP 4 operates as a parent station. As a result, the printer 10 can appropriately perform a wireless communication with the terminal 6 via the AP 4 by using the wireless network NW1.

(Case B2)

T40 of case B2 is the same as T40 of case B1. However, unlike case B1, in a case for example where the power of the terminal 6 is off, the terminal 6 does not perform a search process. In this case, the printer 10 determines that a predetermined time has passed (YES in S120 of FIG. 5) and, in T70, stops the operation as a parent station (S122). Then, in T72, the printer 10 performs a search process (S124), but cannot find the AP 4 (NO in S126). As a result, although not illustrated, the printer 10 again performs the process of setting a waiting time in T34 (unconnect END of FIG. 5, NO in S90 of FIG. 4, S80).

Figure 8:
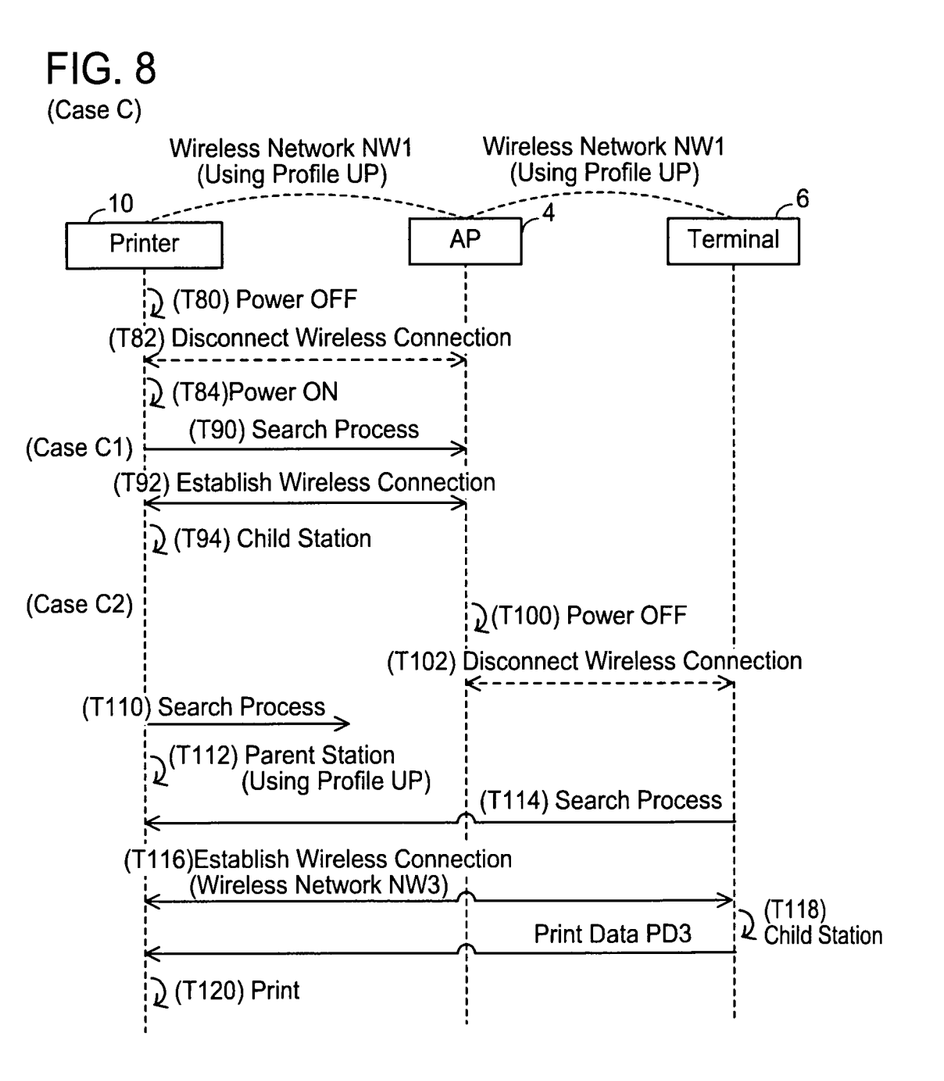
FIG. 8 shows a sequence view of a case C in which power of the printer is turned off.

(Case C; FIG. 8)

Case C is a continuation of case A, wherein the wireless network NW1 to which the apparatuses 4, 6, 10 are belonged has been formed. In T80, the power of the printer 10 is switched from the ON state to the OFF state. As a result, in T82, the wireless connection between the printer 10 and the AP 4 is disconnected. Then, in T84, the power of the printer 10 is switched from the OFF state to the ON state (the trigger of the process of FIG. 2). In this case, the printer 10 obtains the using profile UP from the NVRAM 26 (S10). Then, case C1 or case C2 below is realized.

(Case C1)

In T90 of case C1, the printer 10 performs the search process (S12). The AP 4 can be found (YES in S20). In this case, in T92 the printer 10 re-establishes a wireless connection with the AP 4 (S22) and, in T94, again operates as a child station of the wireless network NW1 (S22). Thus, the wireless network NW1 is re-formed in which each of the printer 10 and the terminal 6 operates as a child station, and the AP 4 operates as a parent station. As a result, the printer 10 can appropriately perform a wireless communication with the terminal 6 via the AP 4 by using the wireless network NW1.

(Case C2)

In T100 of case C2, the power of the AP 4 is switched from the ON state to the OFF state. As a result, in T102, the wireless connection between the terminal 6 and the AP 4 is disconnected. In T110, the printer 10 performs the search process (S12), but cannot find the AP 4 (NO in S20). In this case, in T112, the printer 10 starts operation as a parent station in order to form a wireless network NW3 in which the using profile UP is used (S24). Then, in T114, the terminal 6 performs a search process, and can find the printer 10 which is operating as a parent station. That is, the printer 10 receives a Probe Request signal (i.e., connection request) which includes the SSID in the using profile UP from the terminal 6 (YES in S30 of FIG. 2), and sends a Probe Response signal to the terminal 6. Then, in T116, the printer 10 establishes a wireless connection with the terminal 6 (S32). Thus, in T118, the terminal 6 starts operation as a child station of the wireless network NW3. As a result, the wireless network NW3 is formed in which the printer 10 operates as a parent station and the terminal 6 operates as a child station.

The printer 10 can appropriately perform a wireless communication with the terminal 6 not via the AP 4, by using the wireless network NW3. For example, the printer 10 receives print data PD3 from the terminal 6 not via the AP 4. In this case, in T120, the printer 10 performs a print of an image represented by the print data PD3. Thus, even in a case where the power of the AP 4 is in the off state when the power of the printer 10 is switched from the OFF state to the ON state, the user can cause the printer 10 to perform a print by using the terminal 6.

Figure 9:
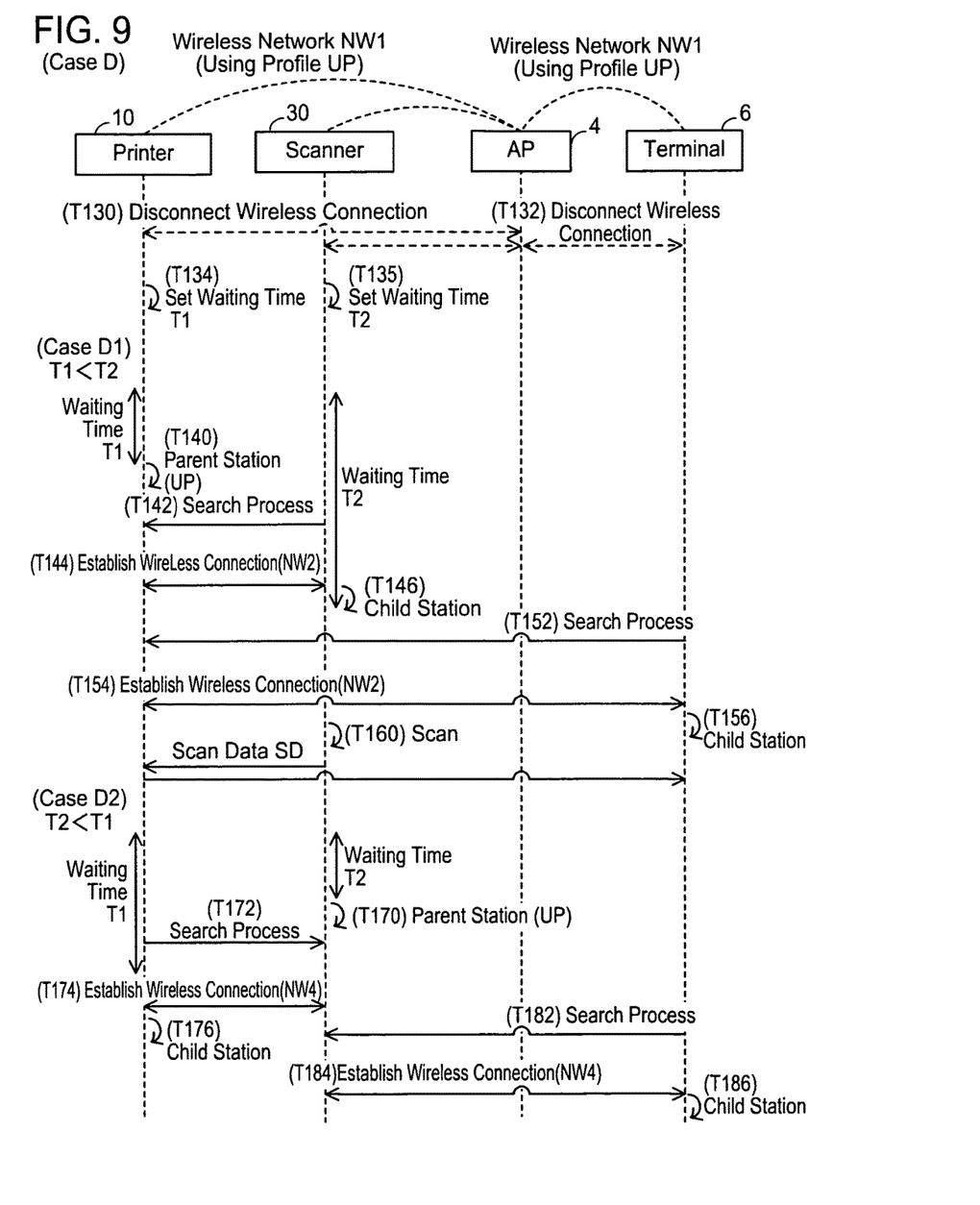
FIG. 9 shows a sequence view of a case D in which a wireless connection between the apparatuses and the access point is disconnected.

(Case D; FIG. 9)

Case D is a continuation of case A, wherein the wireless network NW1 to which the apparatuses 4, 6, 10 are belonged has been formed. Moreover, in case D, the scanner 30 is also operating as a child station of the wireless network NW1. For example, in T130, the wireless connection between the printer 10 and the AP 4 is disconnected (YES in S60 of FIG. 4) due to the user going out possessing the apparatuses 6, 10, 30 and, in T132, the wireless connection between the scanner 30 and the AP 4, and the wireless connection between the terminal 6 and the AP 4 are disconnected. In T134, the printer 10 randomly sets a waiting time T1 (S80). On the other hand, in T135, the scanner 30 also randomly sets a waiting time T2 (S80). Then, case D1 or case D2 below is realized.

(Case D1)

In case D1, the waiting time T1 of the printer 10 is shorter than the waiting time T2 of the scanner 30. In this case, in T140, the printer 10 determines that the waiting time T1 has passed (YES in S82), and starts operation as a parent station in order to form the wireless network NW2 in which the using profile UP is used (S84).

Then, in T142, the scanner 30 performs a search process (S92), and can find the printer 10 which is operating as a parent station (YES in S94). Then, in T144, the scanner 30 establishes a wireless connection with the printer 10 (S96) and, in T146, starts operation as a child station of the wireless network NW2 (S96). In other words, the printer 10 establishes a wireless connection with the scanner 30, and causes the scanner 30 to be belonged to the wireless network NW2 as a child station (YES in S100, S102 of FIG. 5). As a result, the wireless network NW2 in which the printer 10 operates as a parent station, and the scanner 30 operates as a child station is formed.

Further, in T152, the terminal 6 performs a search process, and can find the printer 10 which is operating as a parent station. Then, in T154, the terminal 6 establishes a wireless connection with the printer 10 and, in T156, operates as a child station of the wireless network NW2. In other words, the printer 10 establishes a wireless connection with the terminal 6, and causes the terminal 6 to be belonged to the wireless network NW2 as a child station (YES in S100 of FIG. 5, S102). As a result, the wireless network NW2 in which the printer 10 operates as a parent station, and the scanner 30 and the terminal 6 each operate as a child station is formed.

As shown in case D1, in a case where the waiting time T1 has passed which is shorter than the waiting time T2 of the scanner 30, the printer 10 starts operation as a parent station of the wireless network NW2 (T140). Then, the printer 10 establishes a wireless connection with each of the scanner 30 and the terminal 6 (T144, T154). Thus, the wireless network NW2 to which the apparatuses 6, 10, 30 are belonged is formed. As a result, by using the wireless network NW2, the printer 10 can appropriately perform a wireless communication with the scanner 30 and the terminal 6 not via the AP 4. For example, in T160, the scanner 30 creates scan data SD by performing a scan. Then, the printer 10 receives the scan data SD from the scanner 30 not via the AP 4, and sends the scan data SD to the terminal 6 not via the AP 4. Thus, while out of the office, the user can see an image represented by the scan data SD obtained from the scanner 30 by using the terminal 6.

(Case D2)

In case D2, the waiting time T1 of the printer 10 is longer than the waiting time T2 of the scanner 30. In this case, in T170, the scanner 30 determines that the waiting time T2 has passed (YES in S82) and starts operation as a parent station in order to form a wireless network NW4 in which the using profile UP is used (S84).

Then, in T172, the printer 10 performs a search process (S92), and can find the scanner 30 which operates as a parent station (YES in S94). Then, in T174, the printer 10 establishes a wireless connection with the scanner 30 (S96) and, in T176, starts operation as a child station of the wireless network NW4 (S96).

Further, in T182, the terminal 6 performs a search process, and can find the scanner 30 which operates as a parent station. Then, in T184, the terminal 6 establishes a wireless connection with the scanner 30 and, in T186, starts operation as a child station of the wireless network NW4. As a result, the wireless network NW4 in which the scanner 30 operates as a parent station and the printer 10 and the terminal 6 each operate as a child station is formed.

As shown in case D2, in the case where the waiting time T1 is set to be longer than the waiting time T2 of the scanner 30, the printer 10 establishes a wireless connection with the scanner 30 without operating as a parent station of the wireless network NW2 (T174). The wireless network NW4 to which the apparatuses 6, 10, 30 are belonged is formed. As a result, the printer 10 can appropriately perform a wireless communication with the scanner 30 and the terminal 6 not via the AP 4 by using the wireless network NW4. Although not illustrated, for example the printer 10 can receive print data from the terminal 6 via the scanner 30, and perform a print.

Further, since the waiting times T1, T2 are set randomly, it is possible to prevent the printer 10 and the scanner 30 from shifting simultaneously to the G/O state. Consequently, in a case where T1<T2 (i.e., case D1), the printer 10 operates as a parent station of the wireless network NW2, and can appropriately establish a wireless connection with each of the scanner 30 and the terminal 6. As a result, the wireless network NW2 to which the apparatuses 6, 10, 30 are belonged is formed appropriately. Further, in a case where T1>T2 (i.e., case D2), the printer 10 can appropriately establish a wireless connection with the scanner 30 without operating as a parent station of the wireless network NW2. As a result, the wireless network NW4 to which the apparatuses 6, 10, 30 are belonged is formed appropriately.

(Correspondence Relationship)

The printer 10 and the AP 4 are examples of "first communication apparatus" and "third communication apparatus", respectively. In cases A to C of FIG. 6 to FIG. 8, the terminal 6 is an example of "second communication apparatus" and in case D of FIG. 9, the scanner 30 is an example of "second communication apparatus". The wireless networks NW1 to NW4 are examples of first to fourth wireless networks, respectively. The using profile UP is an example of "wireless profile".

(Modification 1)

In S24 of FIG. 2 and S84 of FIG. 4, instead of shifting the printer 10 to the G/O state of the WFD scheme, the CPU 22 may activate a so-called soft AP. In this case, also, the printer 10 can start operation as a parent station of the wireless network. That is, "parent station" is not restricted to the G/O state of the WFD scheme, but may be realized by a soft AP or another method.

(Modification 2)

S110 to S118 of FIG. 5 may be omitted. S10 to S42 of FIG. 2 may be omitted. S80, S82, S92 to S96 of FIG. 4 may be omitted and, in case of NO in S70, the process may continue to S84. S120 to S128 of FIG. 5 may be omitted.

(Modification 3)

"First (second, third) communication apparatus" is not restricted to the mobile printer 10, the mobile scanner 30, the mobile terminal 6, and the AP 4, but may be another type of apparatus such as a copier, FAX machine, multi-function device, desktop PC, server, etc.

(Modification 4)

In the above embodiment, the CPU 22 of the printer 10 implements each process in FIG. 2 to FIG. 9 by executing the program PG1 (i.e., software) in the ROM 24. Instead, at least one process of each process in FIG. 2 to FIG. 9 may be implemented by hardware such as a logic circuit.

What is claimed is:

1. A first communication apparatus comprising:
a processor; and
a memory storing computer-readable instructions therein, the computer-readable instructions, when executed by the processor, causing the first communication apparatus to perform:
connecting with a third communication apparatus so as to operate as a child station of a first wireless network in which the third communication apparatus operates as a parent station and a second communication apparatus operates as a child station and in which a first SSID is used;
determining, after the first wireless network has been formed, whether the connection between the first communication apparatus and the third communication apparatus is disconnected under a situation where a power of the first communication apparatus is on; and
forming a second wireless network so as to connect with the second communication apparatus after determining that the connection between the first communication apparatus and the third communication apparatus is disconnected, the second wireless network being a network in which the first communication apparatus operates as a parent station and the second communication apparatus operates as a child station and in which a second SSID is used, the second SSID being identical to the first SSID despite the second wireless network being different from the first wireless network.

2. The first communication apparatus as in claim 1, wherein
the computer-readable instructions, when executed by the processor, cause the first communication apparatus to further perform:
determining, after the second wireless network has been formed, whether it is capable of re-establishing a connection between the first communication apparatus and the third communication apparatus;
causing the second wireless network to disappear in a case where it is determined that it is capable of re-establishing the connection between the first communication apparatus and the third communication apparatus; and
re-establishing the connection between the first communication apparatus and the third communication apparatus after the second wireless network has disappeared.

3. The first communication apparatus as in claim 1, wherein
the computer-readable instructions, when executed by the processor, cause the first communication apparatus to further perform:
determining, in a case where a power of the first communication apparatus is turned on after the connection between the first communication apparatus and the third communication apparatus has been disconnected due to a power of the first communication apparatus being turned off under a situation where the first wireless network had been formed, whether re-establishing a connection between the first communication apparatus and the third communication apparatus is possible;
re-establishing the connection between the first communication apparatus and the third communication apparatus in a case where it is determined that re-establishing the connection between the first communication apparatus and the third communication apparatus is possible; and
forming a third wireless network so as to connect with the second communication apparatus after it is determined that it is not capable of re-establishing the connection between the first communication apparatus and the third communication apparatus, the third wireless network being a network in which the first communication apparatus operates as a parent station and the second communication apparatus operates as a child station and in which a third SSID is used, the third SSID being identical to the first SSID despite the third wireless network being different from the first wireless network.

4. The first communication apparatus as in claim 1, wherein
the second wireless network is formed by the first communication apparatus starting an operation as the parent station of the second wireless network after a waiting time, which is set randomly, has passed since it was determined that the connection between the first communication apparatus and the third communication apparatus was disconnected.

5. The first communication apparatus as in claim 4, wherein
the computer-readable instructions, when executed by the processor, cause the first communication apparatus to further perform:
connecting, in a case where the second communication apparatus forms a fourth wireless network in which the second communication apparatus operates as a parent station before the waiting time has passed since it was determined that the connection between the first communication apparatus and the third communication apparatus was disconnected, with the second communication apparatus so as to operate as a child station of the fourth wireless network in which the first SSID is used without starting the operation as the parent station of the second wireless network.

6. The first communication apparatus as in claim 1, wherein
the computer-readable instructions, when executed by the processor, cause the first communication apparatus to further perform:
stopping the operation as the parent station of the second wireless network, in a case where the first communication apparatus does not receive a connection request from the second communication apparatus after starting the operation as the parent station of the second wireless network.

7. The first communication apparatus as in claim 1, wherein:
the second wireless network is formed in a case where a security level of a wireless profile used in the first wireless network is relatively high, and
an operation as the parent station of the second wireless network is not started and the second wireless network is not formed in a case where the security level of a wireless profile used in the first wireless network is relatively low.

8. The first communication apparatus as in claim 1, wherein:
in the first wireless network, the first SSID, first authentication scheme information, first encryption scheme information, and a first password are used, and in the second wireless network, the second SSID, the first authentication scheme information, the first encryption scheme information and the first password are used.

9. The first communication apparatus as in claim 1 further comprising a wireless interface for forming a wireless network, wherein
the determining includes determining whether a connection between the first communication apparatus and the third communication apparatus is disconnected by monitoring whether a beacon signal is received from the third communication apparatus via the wireless interface.

10. The first communication apparatus as in claim 1, wherein:
the computer-readable instructions, when executed by the processor, cause the first communication apparatus to further perform receiving the first SSID from the third communication apparatus so as to store the received first SSID in the memory in a case where the first communication apparatus connects with the third communication apparatus so as to operate as a child station of the first wireless network, and
the forming of the second wireless network is performed by using the first SSID in the memory.

11. A non-transitory computer-readable recording medium storing computer-readable instructions for a first communication apparatus, the computer-readable instructions, when executed by a processor of the first communication apparatus, causing the first communication apparatus to perform:
connecting with a third communication apparatus so as to operate as a child station of a first wireless network in which the third communication apparatus operates as a parent station and a second communication apparatus operates as a child station and in which a first SSID is used;
determining, after the first wireless network has been formed, whether the connection between the first communication apparatus and the third communication apparatus is disconnected under a situation where a power of the first communication apparatus is on; and
forming a second wireless network so as to connect with the second communication apparatus after determining that the connection between the first communication apparatus and the third communication apparatus is disconnected, the second wireless network being a network in which the first communication apparatus operates as a parent station and the second communication apparatus operates as a child station and in which a second SSID is used, the second SSID being identical to the first SSID despite the second wireless network being different from the first wireless network.

* * * * *